United States Patent
Xu et al.

(10) Patent No.: US 12,093,838 B2
(45) Date of Patent: Sep. 17, 2024

(54) EFFICIENT EXECUTION OF A DECISION TREE

(71) Applicant: International Business Machines Corporation, Armonk, NY (US)

(72) Inventors: Jing Xu, Xian (CN); Si Er Han, Xian (CN); Xue Ying Zhang, Xian (CN); Steven George Barbee, Amenia, NY (US); Ji Hui Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1005 days.

(21) Appl. No.: 17/027,688

(22) Filed: Sep. 21, 2020

(65) Prior Publication Data

US 2022/0092437 A1    Mar. 24, 2022

(51) Int. Cl.
*G06N 5/01*       (2023.01)
*G06F 17/18*      (2006.01)
*G06F 18/22*      (2023.01)
*G06F 18/2413*    (2023.01)
*G06N 7/01*       (2023.01)

(52) U.S. Cl.
CPC ............ *G06N 5/01* (2023.01); *G06F 17/18* (2013.01); *G06F 18/22* (2023.01); *G06F 18/2413* (2023.01); *G06N 7/01* (2023.01)

(58) Field of Classification Search
CPC . G06N 5/01; G06N 7/01; G06N 20/00; G06F 17/18; G06F 18/22; G06F 18/2413
See application file for complete search history.

(56) References Cited

U.S. PATENT DOCUMENTS 8,739,022 B2    5/2014  Chiu
10,963,808 B1 * 3/2021  Kumari ............... G06N 5/01
(Continued)

FOREIGN PATENT DOCUMENTS

GB        2516493 A  *  1/2015  ............ G06F 16/28

OTHER PUBLICATIONS

Huang et al., "Method and device for generating decision tree for multi-party decision according to decision content", published May 19, 2020, Document ID CN-111177576-A (Year: 2020).*

(Continued)

*Primary Examiner* — Chau T Nguyen
(74) *Attorney, Agent, or Firm* — Yee & Associates, P.C.

(57) ABSTRACT

Embodiments of the present disclosure relate to a method, system, and computer program product for efficient execution of a decision tree. According to the method, respective target values of a plurality of attributes of a target entity are obtained. Representations of a plurality of leaf nodes of a decision tree are obtained. Each of the representations indicates respective statistic values of a plurality of attributes of historical entities and a statistic prediction result determined from historical prediction results output at a respective one of the plurality of leaf nodes for the historical entities. Distance measures between the target entity and the plurality of leaf nodes are determined based on the target values and the statistic values indicated by the representations of the plurality of leaf nodes. A target prediction result for the target entity is determined based on the distance measures and the statistic prediction results of the historical entities.

20 Claims, 7 Drawing Sheets

(56) References Cited

U.S. PATENT DOCUMENTS

| | | | | |
|---|---|---|---|---|
| 2013/0226856 A1* | 8/2013 | Zhang | ................... | G06N 7/01 |
| | | | | 706/52 |
| 2014/0279775 A1* | 9/2014 | Chu | ................... | G06N 5/022 |
| | | | | 706/20 |
| 2015/0135061 A1 | 5/2015 | Palanichamy | | |
| 2015/0379426 A1* | 12/2015 | Steele | ................... | G06N 5/025 |
| | | | | 706/12 |
| 2017/0004513 A1* | 1/2017 | Vadakattu | ................ | G06N 5/01 |
| 2017/0076214 A1 | 3/2017 | Spisic | | |
| 2018/0308124 A1* | 10/2018 | Gao | ................... | G06N 5/01 |
| 2019/0279097 A1* | 9/2019 | Baines | ................... | G06N 5/01 |
| 2020/0167662 A1* | 5/2020 | Li | ................... | G06N 5/01 |

OTHER PUBLICATIONS

Chen et al. (Chen), "Determining Method, Device, Equipment and Medium Degree in Parallel", published Aug. 23, 2019, Document ID: CN 109558232 B, p. 18 (Year: 2019).*

"sklearn.tree.DecisionTreeClassifier," scikit-learn developers, accessed Sep. 21, 2020, 7 pages. <https://scikit-learn.org/stable/modules/generated/sklearn.tree.DecisionTreeClassifier.html>.

Mell et al., "The NIST Definition of Cloud Computing," Recommendations of the National Institute of Standards and Technology, U.S. Department of Commerce, Special Publication 800-145, Sep. 2011, 7 pages.

Yoon et al., "ToPs: Ensemble Learning with Trees of Predictors," IEEE Transactions on Signal Processing, Feb. 13, 2018, 12 pages. <https://arxiv.org/pdf/1706.01396.pdf>.

* cited by examiner

EFFICIENT EXECUTION OF A DECISION TREE

BACKGROUND

The present disclosure generally relates to computer techniques and, more particularly, to a method, system and computer program product for efficient execution of a decision tree.

A decision tree is a decision analysis tool that uses a tree-like model of decisions and possible consequences to predict an output for a target entity based on a set of predictors. Because a decision tree is easy to interpret and understand, it is a popular data mining tool for prediction in various applications. For example, decision trees are used to implement gesture recognition, voice recognition, data mining, document search, and other types of computations.

SUMMARY

According to one embodiment of the present disclosure, there is provided a computer-implemented method. According to the method, respective target values of a plurality of attributes of a target entity are obtained. The plurality of attributes are used for prediction in a decision tree. Representations of a plurality of leaf nodes of a decision tree are obtained. Each of the representations indicates respective statistic values of a plurality of attributes of historical entities and a statistic prediction result determined from historical prediction results output at a respective one of the plurality of leaf nodes for the historical entities. Respective distance measures between the target entity and the plurality of leaf nodes are determined based on the target values and the statistic values indicated by the representations of the plurality of leaf nodes. A target prediction result for the target entity is determined based on the respective distance measures and the statistic prediction results of the historical entities.

According to a further embodiment of the present disclosure, there is provided a system. The system comprises a processing unit; and a memory coupled to the processing unit and storing instructions thereon. The instructions, when executed by the processing unit, perform acts of the method according to the embodiment of the present disclosure.

According to a yet further embodiment of the present disclosure, there is provided a computer program product being tangibly stored on a non-transient machine-readable medium and comprising machine-executable instructions. The instructions, when executed on a device, cause the device to perform acts of the method according to the embodiment of the present disclosure.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
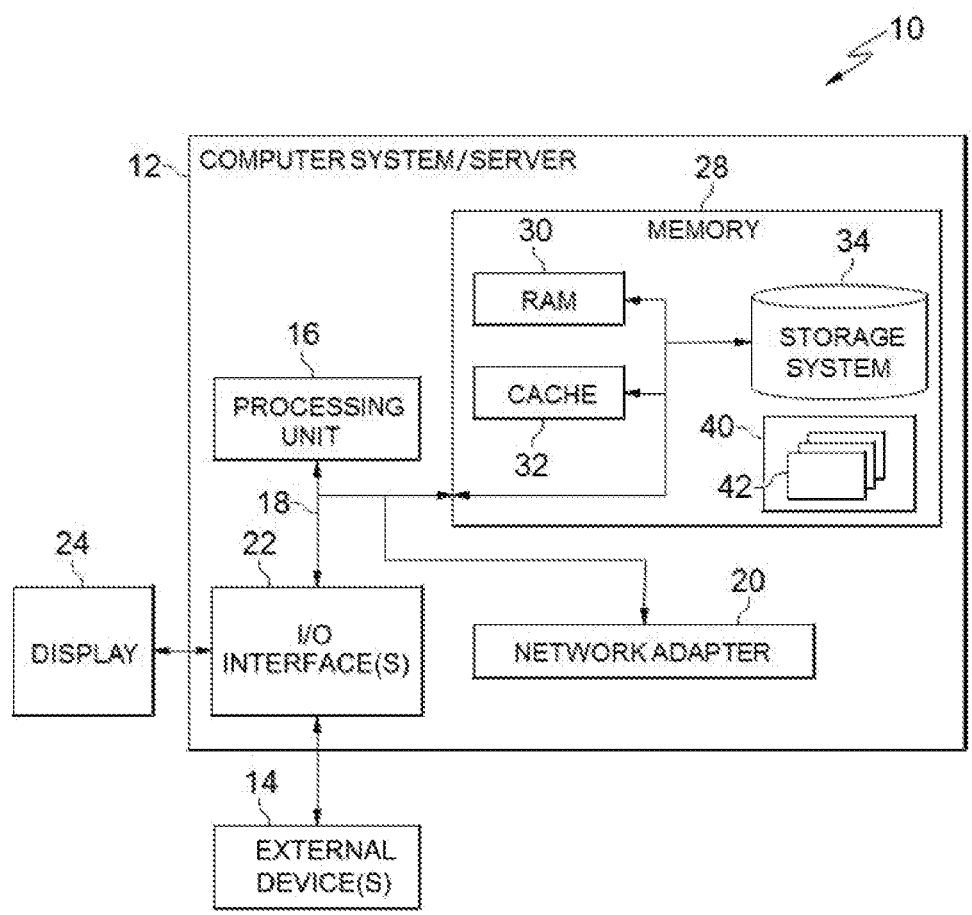
FIG. 1 depicts a cloud computing node according to some embodiments of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
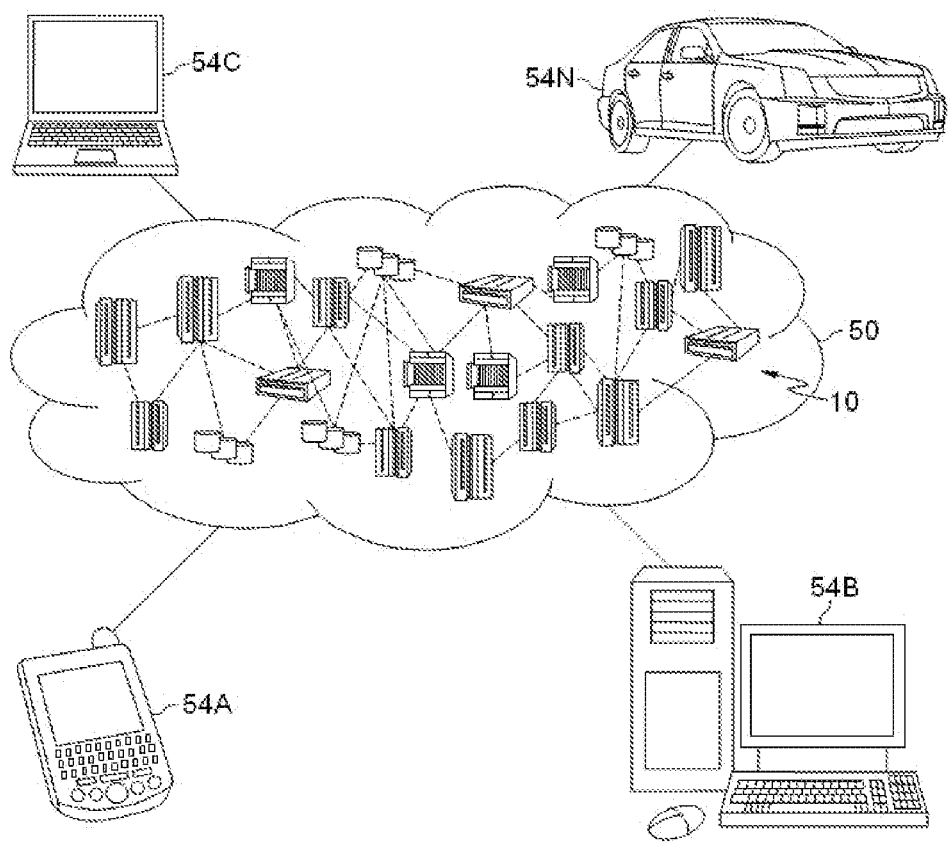
FIG. 2 depicts a cloud computing environment according to some embodiments of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
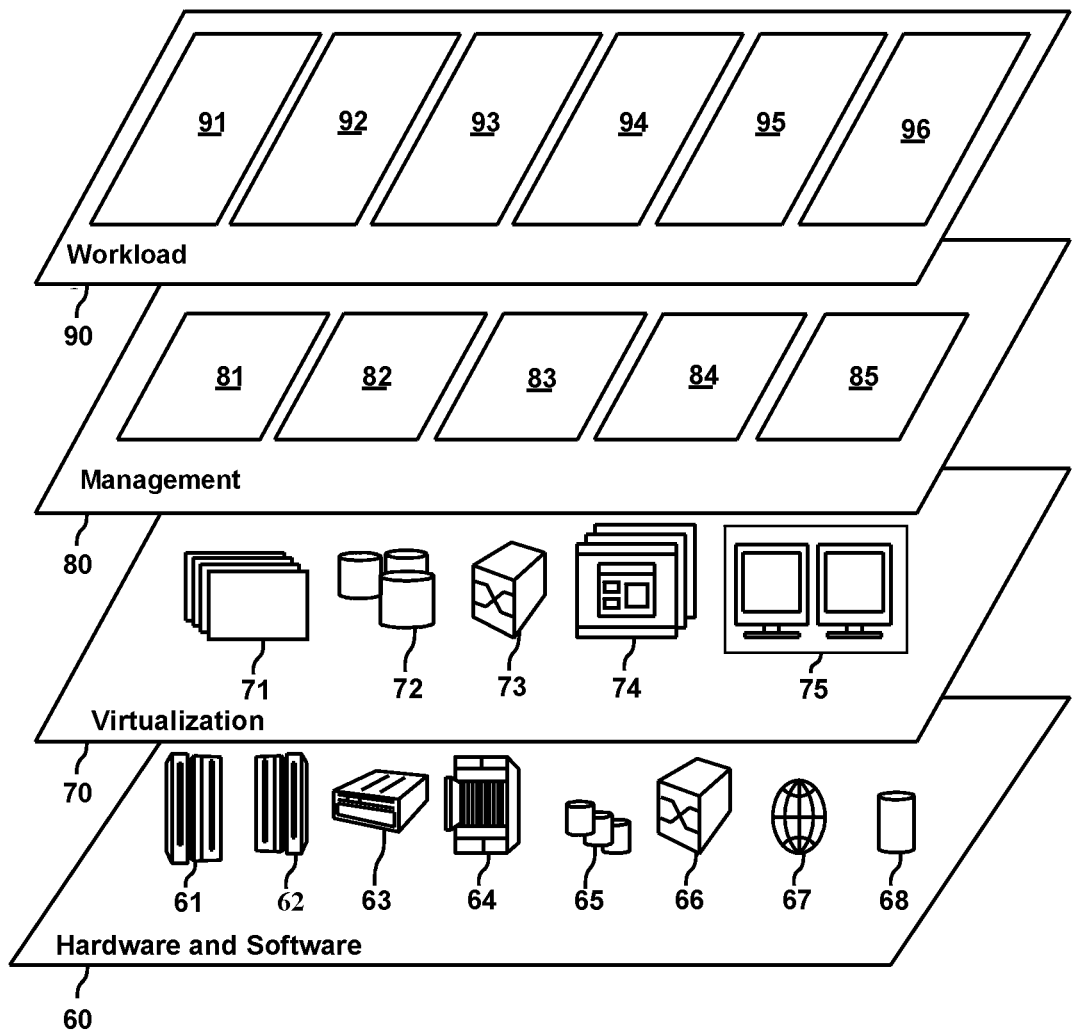
FIG. 3 depicts abstraction model layers according to some embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and efficient decision tree execution 96. The functionalities of efficient decision tree execution 96 will be described in the following embodiments of the present disclosure.

As mentioned above, decision trees have a great variety of applications. Decision trees can be regression trees or classification trees. A regression tree may be used to predict an output value for an entity from a continuous output value range, while a classification tree may be used to classify an entity into discrete output categories. An entity may be any data source such as a document, an image, an audio, a physical or virtual object, and/or the like against which a prediction is to be made. A decision tree may also be referred to as a tree model.

Figure 4:
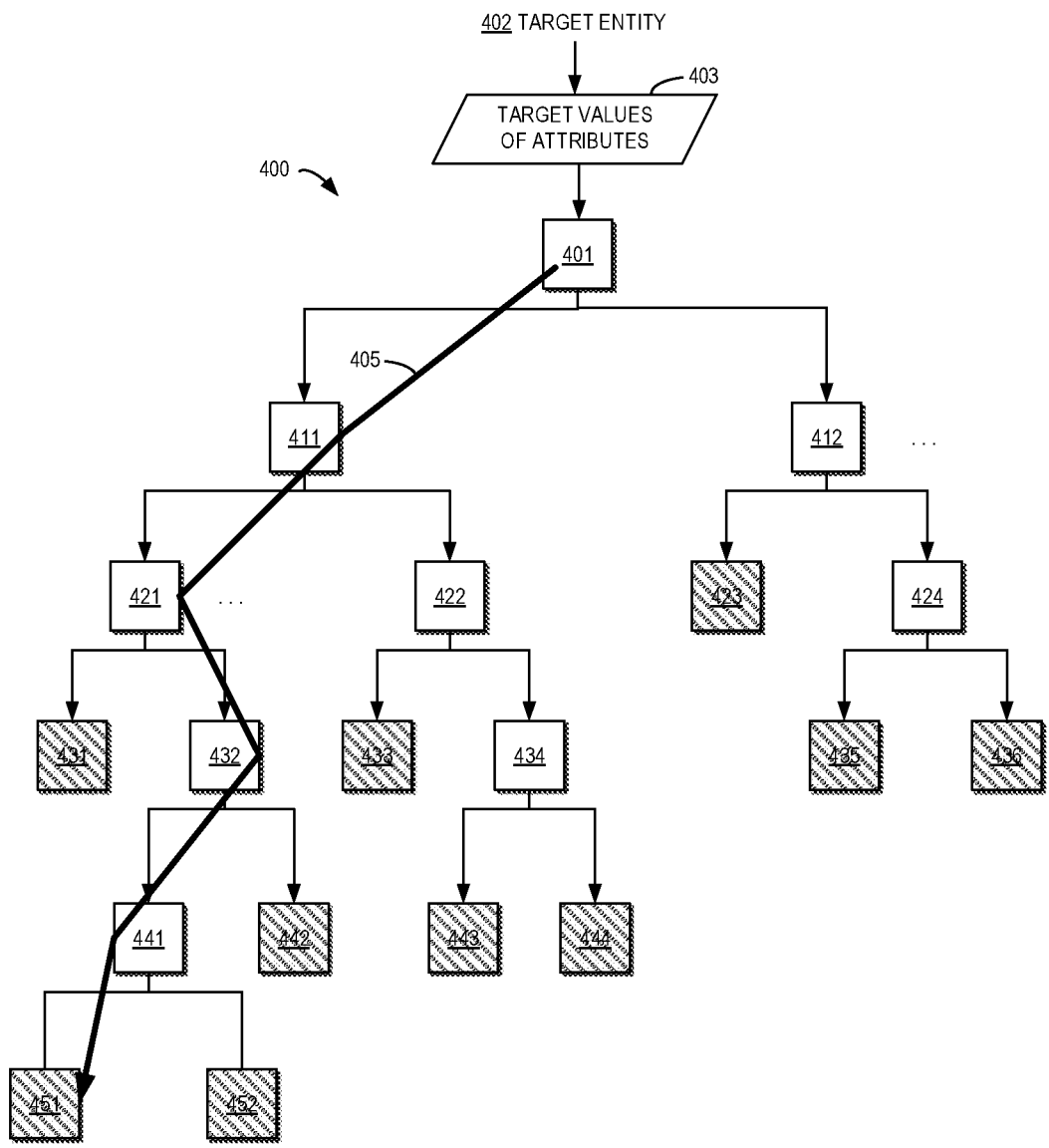
FIG. 4 depicts an example decision tree according to some embodiments of the present disclosure.

To better understand a decision tree, FIG. 4 illustrates an example decision tree 400 according to some embodiments of the present disclosure.

The decision tree 400 is comprised of decision nodes and leaf nodes. A decision node includes a decision to be made based on one or more values of one or more attributes of an entity to be predicted by a decision tree. That is, each decision node is associated with one or more attributes of an entity. Two or more decision nodes in a decision tree may be associated with a same attribute. Each decision node in the decision tree may be referred to as a predictor. All of the attributes associated with the predictors are different features that can be used to derive a prediction result by the decision tree 400.

A leaf node represents an output of the decision tree, to provide a prediction result. Depending on the type of the decision tree (e.g., a regression tree or a classification tree), a prediction result from a leaf node may be a target value from a continuous output value range or an indication of a target output category selected from the output categories of the decision tree.

In the shown example, the decision tree 400 comprises a root decision node 401 which is connected to two other decision nodes 411 and 412. The decision node 411 is further connected to two other decision nodes 421 and 422, while the decision node 412 is connected to a leaf node 422 and a decision node 424. A leaf node represents an output of the decision tree 400 and no branches are derived from the leaf node. Overall, the decision tree 400 comprises decision nodes 401, 411, 412, 421, 422, 424, 432, 434, and 441, and leaf nodes 423, 431, 433, 435, 436, 442, 443, 444, 451, and 452.

It would be appreciated that the structure of the decision tree 400 in FIG. 4 is provided merely for the purpose of illustration. Other example decision trees may include more or less decision nodes and leaf nodes, more or less hierarchical levels, and/or the like. Other decision trees may not be binary trees but may be of any other types of tree structures.

Conventionally, to provide a prediction result for a new entity using a decision tree, it has to traverse from a root decision node to leaf nodes. For example, a decision is made at a decision node. Branches lead from a decision node to other decision nodes or to leaf nodes, and a selection of one of the branches is based on the decision made at the decision node. An example decision includes the comparison of two values, such as a value of an attribute of a target entity to be processed and a threshold value for this attribute. If the value is less than or equal to the threshold value, then a left subtree is selected; if the value is not less than or equal to the threshold value, then the right subtree is selected. The branch is followed to the next node and, and if the next node is a decision node, another decision is made, and so on until a branch leading to a leaf node is selected. This process is referred to as traversal of the decision tree or "tree traversal."

In the shown example, to determine a prediction result for a target entity 402, depending on target values 403 of respective attributes of the target entity 402, a path 405 from the root decision node 401 to the leaf node 451 is traversed. The attributes are those associated with the decision nodes in the decision tree 400. The prediction result at the leaf node 451 is then output for the target entity 402. This means that the target entity 402 reaches the leaf node 451 through the path 405.

In practice, almost all tree applications require traversing the decision trees at one time or another and often repeatedly. The complexity of tree traversal increases as the complexity of a decision tree increases, e.g., as the number of nodes in the decision tree or the hierarchical levels of the decision tree grow. The tree traversal process cannot be executed in a parallel manner as the decision node to be executed in a next step directly depends on the decision result made at the previous node. Consequently, tree traversal is often a very expensive process, e.g., in terms of time and/or computing resource consumption. Also, the entire tree structure may be stored or available for access in order to enable the prediction, which requires a lot of storage consumption.

In addition, many applications require the traversal of multiple decision trees in order to increase accuracy. For example, in Machine Learning applications, a random forest (RF) model often requires the evaluation of multiple decision trees, i.e., traversing multiple decision trees, for any one target entity. Although parallel execution of different decision tress is possible, the inefficient execution of the individual decision trees may result in high resource consumption.

According to example embodiments of the present disclosure, there is proposed a new solution for efficient execution of a decision tree. In this solution, leaf nodes of the decision tree are respectively represented with proper statistic information related to a plurality of attributes used for prediction in the decision tree. For each leaf node, its representation includes respective statistic values of a plurality of attributes of historical entities and a statistic prediction result determined from historical prediction results of the historical entities output by the decision tree, where the historical entities are those reaching this leaf node in historical traversal of the decision tree.

In execution of the decision tree to provide a target prediction result for a target entity, the representations of the leaf nodes are obtained. Respective distance measures between the target entity and the respective leaf nodes are determined based on target values of the attributes of the target entity and the statistic values indicated by the representations of the leaf nodes. A target prediction result for the target entity is determined based on the respective distance measures and the statistic prediction results of the historical entities.

Through this solution, instead of storing and accessing an entire structure of a decision tree for execution, representations of the leaf nodes are constructed and used to determine a target prediction result for a target entity, which can significantly reduce the storage requirement and access overhead of the decision tree. In addition, as the distance measures are determined with respect to the leaf nodes, the solution described herein can efficiently support parallel execution of the determination of the distance measures if needed, which can highly improve the execution speed.

Other advantages of the present disclosure will be described with reference to the example embodiments and the accompanying drawings below.

Figure 5:
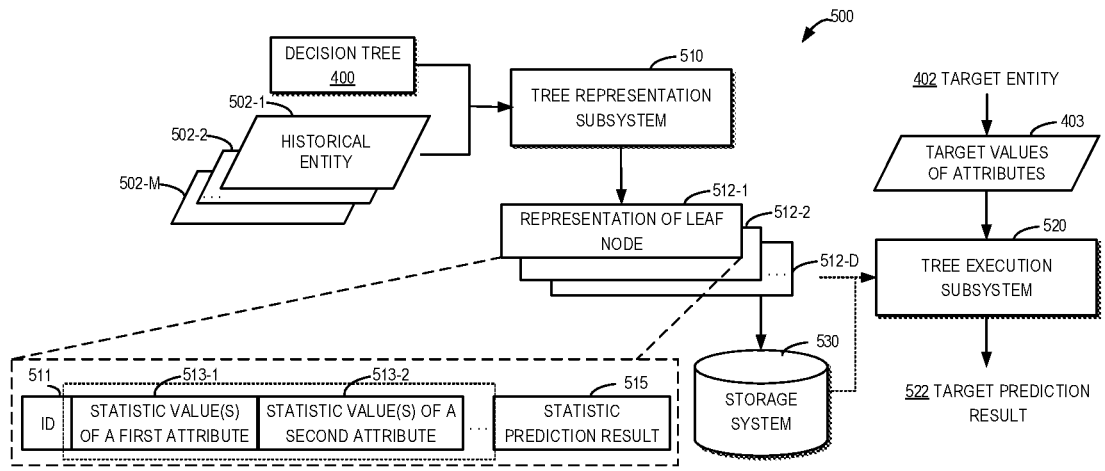
FIG. 5 depicts a block diagram of a system for efficient execution of a decision tree according to some embodiments of the present disclosure.

Reference is now first made to FIG. 5, which illustrates a block diagram of a system 500 for efficient execution of a decision tree according to some embodiments of the present disclosure. For convenience of discussion, reference will be made to the example decision tree 400 of FIG. 4 and target values 403 of attributes of a target entity 402 which is intended to be processed by the decision tree 400.

The system 500 comprises a tree representation subsystem 510 which is configured to convert the entire decision tree 400 into representations of leaf nodes of the decision tree 400. The system 500 further comprises a tree execution subsystem 520 which is configured to provide a target prediction result for a new entity using the representations of the leaf nodes of the decision tree 400.

Specifically, the tree representation subsystem 510 is configured to determine respective representations 512-1, 512-2, . . . , 512-D of leaf nodes of the decision tree 400 based on the decision tree 400 and historical entities 502-1, 502-2, . . . , 502-M predicted by the decision tree 400, where D and M are integers larger than one. The representations 512-1, 512-2, . . . , 512-D are collectively or individually referred to as representations 512 hereinafter, and D is the number of leaf nodes in the decision tree 400. The historical entities 502-1, 502-2, . . . , 502-M are collectively or individually referred to as historical entities 502 hereinafter, and D is the number of the historical entities.

The tree representation subsystem 510 may identify each leaf node from the decision tree 400. In the example of FIG. 4, the leaf nodes 423, 431, 433, 435, 436, 442, 443, 444, 451, and 452 are identified. The tree representation subsystem 510 determines a representation 512 for each leaf node based on information related to the historical entities 502. In particular, the tree representation subsystem 510 may obtain historical values of a plurality of attributes of the historical entities 502 and historical prediction results for the historical entities 502 to determine the representations 512 of the leaf nodes.

The attributes are those used for prediction by the decision nodes in the decision tree 400. For example, decision nodes of the decision tree 400 may be built to make decisions based on an "age," a "gender," a "height," and a "weight" of an entity, where the "age," "gender," "height," and "weight" are the attributes. Specific values of the attributes of an entity are extracted to execute the prediction in the decision tree. The historical prediction results of the historical entities 502 are those output by the decision tree 400 for the historical entities 502.

The historical entities 502 may include training entities obtained from a training dataset that is used to construct the decision tree. Alternatively, or in addition, the historical entities 502 may include entities collected from historical traversal of the decision tree 400, for example, through traversing the decision tree 400 from the root node, e.g., the root decision node 401 to the leaf nodes 423, 431, 433, 435, 436, 442, 443, 444, 451, and 452 to obtain the historical prediction results. In other embodiments, the historical entities 502 may include entities whose values of the attributes and their prediction results in the decision tree 400 are known without actually executing the decision tree 400.

As specifically illustrated in FIG. 5, a representation 512 for a leaf node of the decision tree 400 may be identified with corresponding identification (ID) information 511 for the leaf node. In some embodiments, the ID information 511 may include a tree ID of the decision tree 400 and a node ID of the corresponding leaf node. In embodiments of the present disclosure, a representation 512 for a leaf node of the decision tree 400 is determined to indicate statistic information from the historical entities 502. In some embodiments, the number of the historical entities 502 may be large enough such that statistic information derived from the historical entities 502 is meaningful and accurate.

As illustrated in FIG. 5, the attribute statistic information indicated by a representation 512 includes one or more statistic values of each of the attributes of the historical entities 502, e.g., a statistic value(s) 513-1 of a first attribute, a statistic value(s) 513-2 for a second attribute, and so on. For ease of discussion, the statistic values 513-1, 513-2, . . . , of the attributes of the historical entities 502 are collectively or individually referred to as statistic values 513 of the attributes. The statistic value(s) 513 of an attribute of the historical entities 502 may be determined from historical values of this same attribute of the historical entities 502.

An attribute of the entities may include a continuous attribute which can be valued from a continuous value range or a categorical attribute which can be valued from a plurality of discrete categories. In some embodiments, if an attribute used for prediction in the decision tree 400 is a continuous attribute, the statistic value(s) 513 of this attribute may comprise a mean of respective historical values of the continuous attribute of the historical entities 502. Alternatively, or in addition, the statistic value(s) 513 of this attribute may comprise a variance of respective historical values of the continuous attribute of the historical entities 502, and/or a total count of the historical entities 502. As will be understood from the following description, the statistic value(s) 513 of an attribute can be used to facilitate determination of a distance measure between a new target entity and a leaf node.

In some embodiments, if an attribute used for prediction in the decision tree 400 is a categorical attribute related to a plurality of categories, the statistic value(s) 513 of this attribute may comprise a statistical distribution of the plurality of categories into which the historical entities 502 are classified. In an example, the statistical distribution may indicate, for example, respective counts of historical entities 502 classified into the respective categories.

Figure 6A:
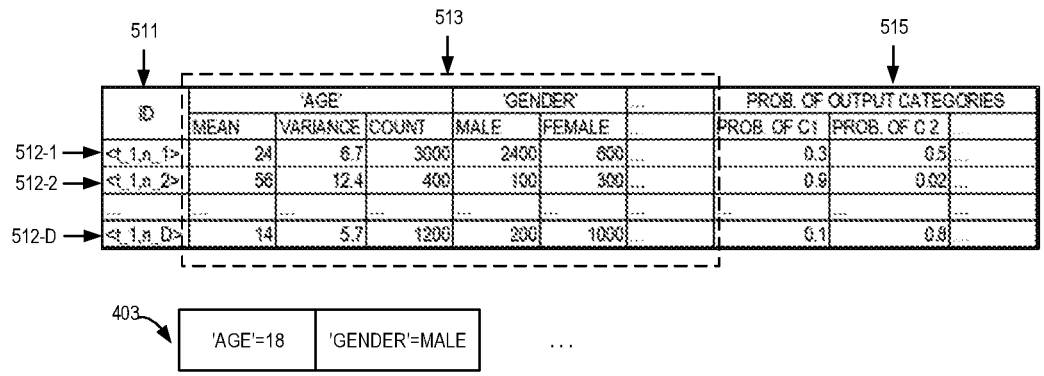
FIGS. 6A and 6B depict examples of representations of leaf nodes in a decision tree according to some embodiments of the present disclosure.

FIG. 6A illustrates an example of representations 512 of leaf nodes in the decision tree 400. In this example, the attributes used in the decision tree 400 include a continuous attribute of "age" which is related to a continuous age range, a categorical attribute of "gender" which is related to a first category of "male" and a second category of "female," and the like.

For a representation 512-1 of a leaf node "<t_1, n_1>", in addition to the ID information 511, the statistic value(s) 513 of the attribute of "age" include a mean value "24" of ages of the historical entities 502 that reaches the corresponding leaf node "<t_1, n_1>", a variance value "6.7" of the ages of the historical entities 502, and a total count "3000" of the historical entities 502 reaching the leaf node "<t_1, n_1>". The statistic value(s) 513 of the attribute of "gender" indicated by the representation 512-1 includes counts of the categories "male" and "female" into which the total of 3000 historical entities 502 are classified respectively. FIG. 6A further illustrates the statistic value(s) 513 of the attributes of "age" and "gender" indicated by other representations 512-2, . . . , 512-D of other leaf nodes.

In addition to the statistic values 513 of the attributes, the attribute statistic information indicated by a representation 512 further includes a statistic prediction result 515 for the leaf node. The statistic prediction result 515 for the leaf node may be determined from the historical prediction results output at the leaf node for the historical entities 502. For example, in traversal of the decision tree 400 for a historical data entry, if a path is from the root decision node 401 and reaches the leaf node 451, a historical prediction result output at the leaf node 451 may be used to determine the statistic prediction result 515 for this leaf node 451.

The statistic prediction result 515 for each leaf node may depend on the type of prediction results output by the decision tree 400, which is based on the type of the decision tree 400. In some embodiments, if the decision tree 400 is a classification tree which classifies an entity into a plurality of discrete output categories, a prediction result of the decision tree 400 may be an indication of an output category into which the entity is classified. For example, the indication may include respective probabilities of the entity being classified into the plurality of output categories, where the highest probability indicates the predicted category of the entity. In the case where the decision tree 400 is a classification tree, a historical prediction result of a historical entity 502 may include respective historical probabilities of the historical entity 502 being classified into a plurality of output categories of the decision tree 400. The statistic prediction result 515 for a leaf node may be determined from the respective historical probabilities of the historical entities 502 output at this leaf node. For example, the statistic prediction result 515 may be determined by averaging the respective historical probabilities of the historical entities 502 for the respective output categories.

In some embodiments, if the decision tree 400 is a regression tree which predicts an output value for an entity from a continuous output value range, a prediction result of the decision tree 400 may include the output value. In this case, a historical prediction result of a historical entity 502 may include a historical output value of the historical entity 502 from the continuous output value range of the decision tree 400. The statistic prediction result 515 for a leaf node may be determined from the respective output values of the historical entities 502 output at this leaf node. For example, the statistic prediction result 515 may be determined as a mean value of the historical output values of the historical entities 502.

In the example of FIG. 6A, the decision tree 400 is assumed to be a classification tree. As shown, the statistic prediction result 515 indicated by the representation 512-1 of the leaf node "<t_1, n_1>" includes probabilities of respective output categories of the decision tree 400, including a probability "0.3" of a first output category (represented as "C1"), a probability "0.5" of a second output category (represented as "C2"), and so on. FIG. 6A further illustrates the statistic prediction result 515 indicated by other representations 512-2, . . . , 512-D of other leaf nodes.

Figure 6B:
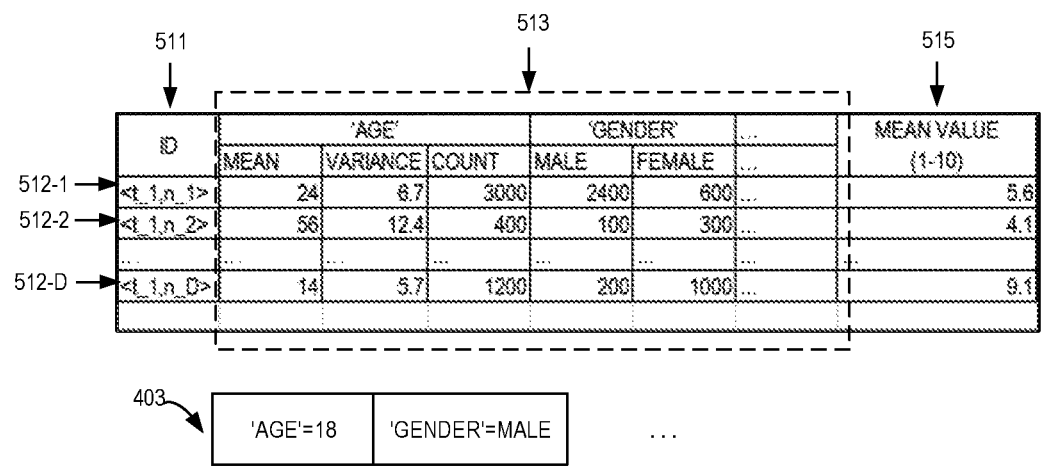

FIG. 6B illustrates another example of representations 512 of leaf nodes in the decision tree 400. In this example, the decision tree 400 is a regression tree. The ID information 511 and the statistic values 513 of the attributes indicated by the representations 512 are the same as in the example of FIG. 6A. The difference in this example of FIG. 6B is that the statistic prediction result 515 indicated by a representation 512 of a leaf node includes a mean value of historical output values at the leaf node for the historical entities 502. As illustrated, the statistic prediction result 515 indicated by the representation 512 of a leaf node "<t_1, n_1>" is a value "5.6" from a continuous value range from 1 to 10. The statistic prediction result 515 indicated by other representations 512 are also illustrated in FIG. 6B.

It would be appreciated that the representations in FIGS. 6A and 6B are provided merely for the purpose of illustration without suggesting any limitation to the scope of the present disclosure.

The representations 512 of the leaf nodes of the decision tree 400 are determined according to the embodiments as discussed above. Reference is made back to FIG. 5, the representations 512 of the leaf nodes of the decision tree 400 may be stored into a storage system 530 for use of making a prediction of the decision tree 400. The decision tree 400 may not need to be stored for execution. In some embodiments, as the representations 512 of the leaf nodes does not depend on each other, those representations 512 may be stored in a distributed manner, for example, may be stored into a plurality of storage devices in the storage system 530.

In operation, if it is intended to make a prediction for a target entity 402 by the decision tree 400, the tree execution subsystem 520 is configured to obtain representations 512 of the leaf nodes of the decision tree 400 either from the storage system (e.g., from plurality of storage devices), or directly from the tree representation subsystem 510.

The tree execution subsystem 520 also obtains target values 403 of the attributes of the target entity 402. For example, as illustrated in FIGS. 6A and 6B, the target values 403 may include an age of "14," a gender of "male," and the like. The tree execution subsystem 520 is configured to determine respective distance measures between the target entity 402 and the respective leaf nodes of the decision tree 400 based on the target values 403 of the attributes of the target entity 402 and the statistic values 513 as indicated by the respective representations 512 of the leaf nodes.

A distance measure between the target entity 402 and one given leaf node is used to measure a probability of the target entity 402 reaching the given leaf node if the decision tree 400 is traversed. If the target entity 402 reaches the given leaf node, it means that a target prediction result is output by the given leaf node for the target entity 402. In the embodiments of the present disclosure, through the sufficient statistic information at the leaf nodes, it is possible to correctly measure the probability of the target entity 402 reaching each of the leaf nodes.

The distance measures may be determined based on various distance computing algorithms such as a Euclidean distance, a log likelihood distance, and the like. A distance measure may be determined by calculating individual distance measures per attribute and combining the individual distance measures. As an alternative, an overall distance measure may be determined directly from the target values 403 and the statistic values 513. In some embodiments, if the Euclidean distance is calculated, the mean values of the statistic values 513 is used and other statistic values (e.g., the variance values and the counts) can be omitted. In some embodiments, if the log likelihood distance is calculated, the mean values, the variance values, and the counts may also be used for calculation. The calculation of the distance measures determined from the target values 403 and the statistic values 513 is well known for those skilled in the art and is not described in details herein.

The tree execution subsystem 520 is further configured to determine a target prediction result 522 for the target entity 402 based on the respective distance measures and the statistic prediction results of the historical entities 502. The target prediction result 522 may be an output value from a continuous output range if the decision tree 400 is a regression tree. The target prediction result 522 may be a vector indicating respective probabilities related to a plurality of output categories if the decision tree 400 is a classification tree.

In some embodiments, the target prediction result 522 may be determined by weighting the statistic prediction results of the historical entities based on the respective distance measures. In some embodiments, the tree execution subsystem 520 may select a predetermined number of distance measures from the respective distance measures, such as top N distance measures which are all greater than the remaining ones. N may be a predetermined value smaller than the number of the distance measures (which is the number of the leaf nodes). That is, Nis smaller than D. The tree execution subsystem 520 may select the statistic prediction results indicated by representations of leaf nodes having the predetermined number of distance measures with the target entity 402. Those leaf nodes may be considered as the N nearest leaf nodes for the target entity 402. The target prediction result 522 may be determined by weighting the selected statistic prediction results based on the predetermined number of selected distance measures.

It is assumed that the N selected distance measures are $D_1, D_2, \ldots, D_N$ and the selected statistic prediction results are $P_1, P_2, \ldots, P_N$. In an example, the target prediction result 522 (represented as "P") for the target entity 402 may be determined as the follows:

$$P = \Sigma_{i=1}^{N} \exp(-D_i)/\Sigma_j \exp(-D_j) P_i \qquad \text{Equation (1)}$$

Equation (1) provides an example where the weights applied for the selected statistic prediction results are determined based on exponential normalization of the selected distance measures. It would be appreciated that the selected statistic prediction results may be weighted in various other manners based on the selected distance measures.

Based on the representations 512 of the leaf nodes, the execution of the entire decision tree is converted to execution of the distance determination and the final target prediction result deriving. The execution process can be accomplished in an efficient way.

Figure 7:
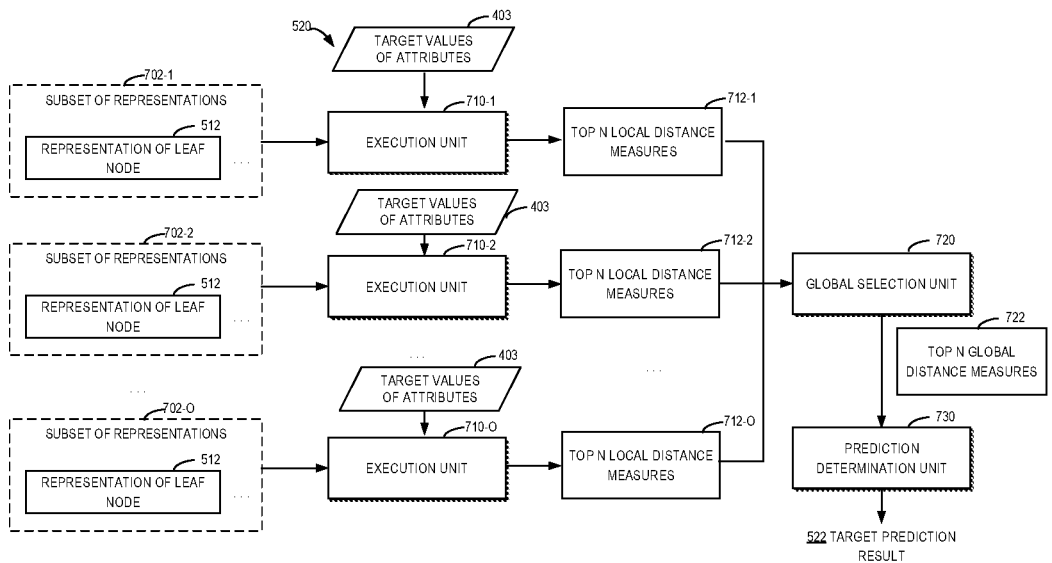
FIG. 7 depicts a block diagram of an example of the tree execution subsystem of FIG. 5 according to some embodiments of the present disclosure.

In some embodiments, as the determination of the measure distances is performed with respect to the individual leaf nodes, it is possible to employ parallel execution of the determination of the measure distances in order to further improve the efficiency. FIG. 7 illustrates a block diagram of an example of the tree execution subsystem 520 of FIG. 5 which is suitable for the parallel execution.

In the example of FIG. 7, the representations 512 of all the leaf nodes of the decision tree 400 are divided into a plurality of subsets of representations 512 of leaf nodes 702-1, 702-2, . . . , 702-O (collectively or individually referred to as subsets 702 of representations 512 of leaf nodes, O is the number of subsets). Each subset 702 comprises at least one representation 512 of at least one leaf node. That is, the leaf nodes of the decision tree 400 are also divided into O subsets corresponding to the O subsets 702 of representations. The subsets 702 of representations may be stored in a distributed manner into a plurality of storage devices in the storage system 530.

As illustrated in FIG. 7, the tree execution subsystem 520 comprises a plurality of execution units 710-1, 710-2, . . . , 710-O (collectively or individually referred to as execution units 710). Each execution unit 710 is configured to determine a subset of distance measures between the target entity 402 and a corresponding subset of leaf nodes based on the target values 403 and the statistic values indicated by the subset 702 of representations. The plurality of execution units 710 may be performed in parallel in order to improve computing efficiency.

To determine the target prediction result for the target entity 402, the predetermined number (N) of global largest distance measures may be selected. Specifically, each execution unit 710 may select top N local distance measures from the subset of distance measures it calculated. Thus, top N local distance measures 712-1, 712-2, . . . , 712-O are selected by the execution units 710-1, 710-2, . . . , 710-O and provided into a global selection unit 720 comprised in the tree execution subsystem 520. The global selection unit 720 may selected top N global distance measures 722 from the top N local distance measures 712-1, 712-2, . . . , 712-O. The selected top N global distance measures 722 may be greater than the remaining distance measures. In some embodiments, each execution unit 710 may select more or less distance measures than the predetermined number N. The scope of the present disclosure is not limited here.

The top N global distance measures 722 are then provided to a prediction determination unit 730 which is configured to determine the target prediction result 522 based on the top N global distance measures 722 and the statistic prediction results of the historical entities 502 indicated by the corresponding representations 512. The determination of the target prediction result 522 may be similar to that described above.

The embodiments of efficient execution of one decision tree are discussed above. In some embodiments, a plurality of decision tress may be used to build an ensemble decision tree to provide a final prediction result for an entity. The efficient execution of a decision tree may be similarly applied to each member decision tree in the ensemble decision tree. Each of the member decision trees may be converted as representations of leaf nodes as discussed in the above embodiments of the present disclosure.

Figure 8:
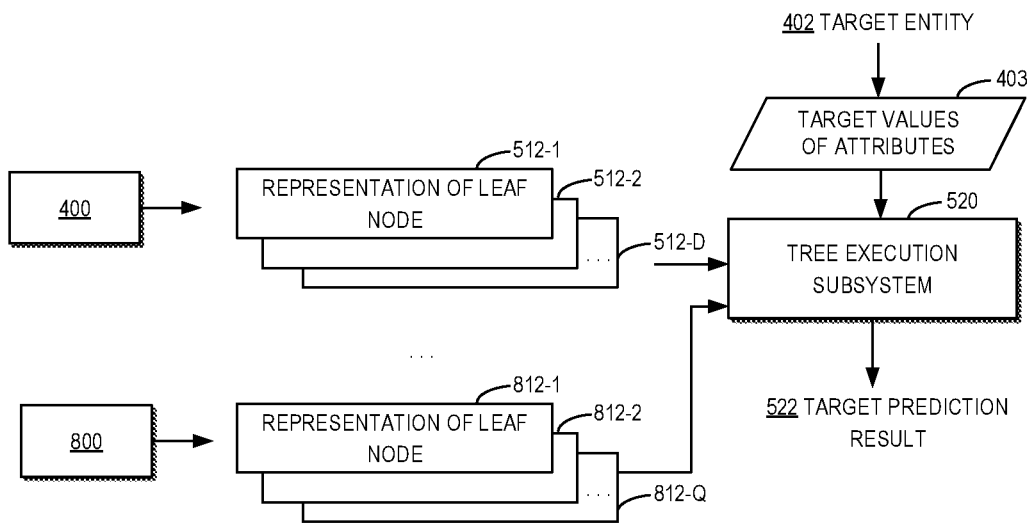
FIG. 8 depicts a block diagram of an example of the tree execution subsystem of FIG. 5 according to some embodiments of the present disclosure.

FIG. 8 illustrates a block diagram of an example of the tree execution subsystem 520 of FIG. 5 according to some embodiments of the present disclosure. In this example, in addition to the representations 512 of leaf nodes from the decision tree 400, the tree execution subsystem 520 also obtains representations 812-1, 812-2, . . . , 812-Q of leaf nodes from a decision tree 800. The representations 812-1, 812-2, . . . , 812-Q are collectively and individually referred to as representations 812, where Q is the number of leaf nodes in the decision tree 800.

The tree execution subsystem 520 is configured to determine the target prediction result 522 for the target entity 402 based on the target values 403 and both the representations 512 of the leaf nodes of the decision tree 400 and the representations 812 of the leaf nodes of the decision tree 800. The tree execution subsystem 520 may be configured to determine distance measures between the target entity 402 and the leaf nodes of the decision tree 800 in parallel by means of the execution units 712 in the example of FIG. 7. In other examples, more execution units may be comprised in the tree execution subsystem 520 to perform parallel determination of distance measures for the decision tree 800. In some embodiments, if two indeterminate target prediction results are determined for each of the decision trees 400, 800, the final target prediction result may be determined by voting or by averaging the indeterminate target prediction results. The voting or averaging approach may be defined in the ensemble decision tree.

It would be appreciated that although two decision trees are illustrated in FIG. 8, more decision trees can be combined into an ensemble decision tree and the efficient execution of the ensemble decision tree is similar to that described above.

Figure 9:
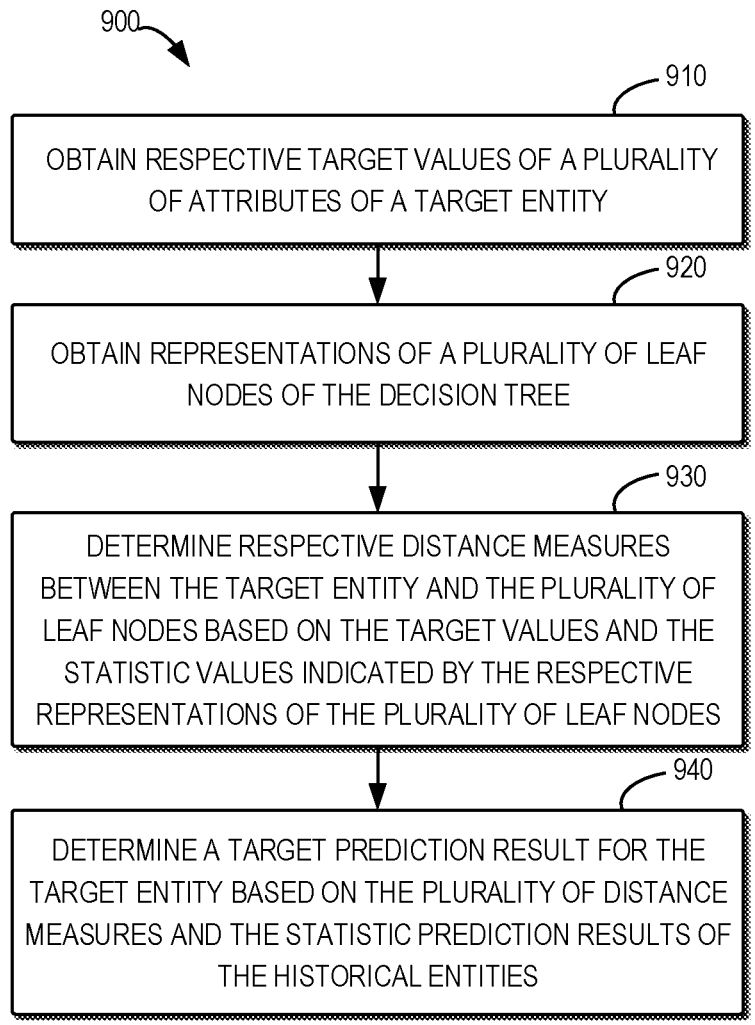
FIG. 9 depicts a flowchart of an example method according to some embodiments of the present disclosure.

FIG. 9 shows a flowchart of an example method 900 according to some embodiments of the present disclosure. The method 900 can be implemented at the system 500 as shown in FIG. 5, especially at the tree execution subsystem 520. For the purpose of discussion, the method 900 will be described from the perspective of the tree execution subsystem 520.

At operation 910, the tree execution subsystem 520 obtains respective target values of a plurality of attributes of a target entity, the plurality of attributes being used for prediction in a decision tree. At operation 920, the tree execution subsystem 520 obtains representations of a plurality of leaf nodes of the decision tree. Each of the representations indicates respective statistic values of a plurality of attributes of historical entities and a statistic prediction result determined from historical prediction results output at a respective one of the plurality of leaf nodes for the historical entities. At operation 930, the tree execution subsystem 520 determines respective distance measures between the target entity and the plurality of leaf nodes based on the target values and the statistic values indicated by the representations of the plurality of leaf nodes. At operation 940, the tree execution subsystem 520 determines a target prediction result for the target entity based on the respective distance measures and the statistic prediction results of the historical entities.

In some embodiments, the representations of the plurality of leaf nodes of the decision tree are stored in a plurality of storage devices, and obtaining the representations comprises: obtaining the representations from the plurality of storage devices.

In some embodiments, the representations are stored with a tree identification of the decision tree and respective node identifications of the plurality of leaf nodes.

In some embodiments, determining the respective distance measures comprises: determining, by one or more processors, a plurality of subsets of distance measures between the target entity and a plurality of subsets of leaf nodes in parallel, each of the plurality of subsets of leaf nodes comprising at least one of the plurality of leaf nodes.

In some embodiments, determining the target prediction result comprises: selecting a predetermined number of distance measures from the respective distance measures; selecting the statistic prediction results indicated by representations of leaf nodes having the predetermined number of distance measures with the target entity; and determining the target prediction result by weighting the selected statistic prediction results based on the predetermined number of selected distance measures.

In some embodiments, the predetermined number of distance measures are greater than remaining distance measures of the respective distance measures.

In some embodiments, the plurality of attributes comprise a categorical attribute related to a plurality of categories, and the statistic value of the categorical attribute of the historical entities comprises a statistical distribution of the plurality of categories into which the historical entities are classified. In some embodiments, the plurality of attributes comprise a continuous attribute related to a continuous value range, and the statistic value of the continuous attribute of the historical entities comprises at least one of the following: a mean value of respective historical values of the continuous attribute of the historical entities, a variance value of respective historical values of the continuous attribute of the historical entities, and a total count of the historical entities.

In some embodiments, a historical prediction result of a historical entity comprises respective historical probabilities of the historical entity being classified into a plurality of output categories of the decision tree. In some embodiments, the statistic prediction result comprises respective statistic probabilities related to the plurality of output categories, the respective statistic probabilities being determined from the respective historical probabilities of the historical entities.

In some embodiments, a historical prediction result of a historical entity comprises a historical output value of the historical entity from a continuous output value range of the decision tree. In some embodiments, the statistic prediction result comprises a mean value of the historical output values of the historical entities.

It should be noted that the processing of efficient decision tree execution according to embodiments of this disclosure could be implemented by computer system/server 12 of FIG. 1.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
obtaining, by one or more processors, respective target values of a plurality of attributes of a target entity, the plurality of attributes being used for prediction in a decision tree;
constructing, by the one or more processors, representations of a plurality of leaf nodes of the decision tree, wherein each of the representations indicate respective statistic values of a plurality of attributes of historical entities that have reached each leaf node of the plurality of leaf nodes in a historical traversal and a statistic prediction result determined from historical prediction results output at a respective one of the plurality of leaf nodes for the historical entities;
subsequently storing each representation of each leaf node constructed;
subsequently accessing and distributing each representation of each leaf node constructed to a respective execution unit;
subsequently determining, by running each respective execution unit in parallel, respective distance measures between the target entity and the plurality of leaf nodes based on the target values and the statistic values indicated by the representations; and
subsequently determining, by the one or more processors, a target prediction result for the target entity based on the respective distance measures and the statistic prediction results of the historical entities.

2. The method of claim 1, further comprising:
storing the representations in a plurality of storage devices: and
obtaining, by the one or more processors, the representations from the plurality of storage devices.

3. The method of claim 2, further comprising:
the statistic values comprising:
for a continuous predictor: mean, variance, and count; and
for a categorical predictor, a distribution of categories;
storing the representations with a tree identification of the decision tree and respective node identifications of the plurality of leaf nodes.

4. The method of claim 1, wherein determining the respective distance measures comprises:
determining, by the one or more processors, a plurality of subsets of distance measures between the target entity and a plurality of subsets of leaf nodes in parallel, each of the plurality of subsets of leaf nodes comprising at least one of the plurality of leaf nodes.

5. The method of claim 1, wherein determining the target prediction result comprises:
selecting, by the one or more processors, a predetermined number of distance measures from the respective distance measures;
selecting, by the one or more processors, statistic prediction results indicated by representations of leaf nodes having the predetermined number of distance measures with the target entity; and
determining, by the one or more processors, the target prediction result by weighting the selected statistic prediction results based on the predetermined number of distance measures.

6. The method of claim 5, wherein the predetermined number of distance measures are greater than remaining distance measures of the respective distance measures.

7. The method of claim 1, wherein the plurality of attributes comprise a categorical attribute related to a plurality of categories, and a statistic value of a categorical attribute of the historical entities comprises a statistical distribution of the plurality of categories into which the historical entities are classified, and wherein the plurality of attributes comprise a continuous attribute related to a continuous value range, and a statistic value of a continuous attribute of the historical entities comprises at least one of the following:
- a mean value of respective historical values of the continuous attribute of the historical entities,
- a variance value of respective historical values of the continuous attribute of the historical entities, and
- a total count of the historical entities.

8. The method of claim 1, wherein a historical prediction result of a respective one of the historical entities comprises respective historical probabilities of the respective historical entity being classified into a plurality of output categories of the decision tree, and wherein the statistic prediction result comprises respective statistic probabilities related to the plurality of output categories, the respective statistic probabilities being determined from the respective historical probabilities of the historical entities.

9. The method of claim 1, wherein a historical prediction result of a historical entity comprises a historical output value of the historical entity from a continuous output value range of the decision tree, and wherein the statistic prediction result comprises a mean value of the historical output values of the historical entities.

10. A system that comprises:
one or more processing units; and
a memory coupled to the one or more processing units and configured to store instructions thereon, the instructions, when executed by the one or more processing units, configured to:
obtain respective target values of a plurality of attributes of a target entity configured to form a prediction in a decision tree;
construct representations of a plurality of leaf nodes of the decision tree, each of the representations configured to indicate respective statistic values of a plurality of attributes of historical entities located in each leaf node of the plurality of leaf nodes post historical traversal and a statistic prediction result determined from historical prediction results output at a respective one of the plurality of leaf nodes for the historical entities;
subsequently store each representation of a respective leaf node constructed;
subsequently access and distribute each representation of a leaf node constructed to a respective execution unit;
subsequently determine, in parallel in each respective execution unit, respective distance measures between the target entity and the plurality of leaf nodes based on the target values and the statistic values indicated by the representations of the plurality of leaf nodes; and
subsequently determine a target prediction result for the target entity based on the respective distance measures and the statistic prediction results of the historical entities.

11. The system of claim 10, wherein the representations of the plurality of leaf nodes of the decision tree are stored in a plurality of storage devices, and obtaining the representations comprises:
obtaining the representations from the plurality of storage devices.

12. The system of claim 11, wherein the representations are stored with a tree identification of the decision tree and respective node identifications of the plurality of leaf nodes.

13. The system of claim 10, wherein determining the respective distance measures comprises:
determining a plurality of subsets of distance measures between the target entity and a plurality of subsets of leaf nodes in parallel, each of the plurality of subsets of leaf nodes comprising at least one of the plurality of leaf nodes.

14. The system of claim 10, wherein determining the target prediction result comprises:
selecting a predetermined number of distance measures from the respective distance measures;
selecting statistic prediction results indicated by representations of leaf nodes having the predetermined number of distance measures with the target entity; and
determining the target prediction result by weighting the selected statistic prediction results based on the predetermined number of distance measures.

15. The system of claim 14, wherein the predetermined number of distance measures are greater than remaining distance measures of the respective distance measures.

16. The system of claim 10, wherein the plurality of attributes comprise a categorical attribute related to a plurality of categories, and a statistic value of a categorical attribute of the historical entities comprises a statistical distribution of the plurality of categories into which the historical entities are classified, and wherein the plurality of attributes comprise a continuous attribute related to a continuous value range, and a statistic value of a continuous attribute of the historical entities comprises at least one of the following:
- a mean value of respective historical values of the continuous attribute of the historical entities,
- a variance value of respective historical values of the continuous attribute of the historical entities, and
- a total count of the historical entities.

17. The system of claim 10, wherein a historical prediction result of a respective one of the historical entities comprises respective historical probabilities of the respective historical entity being classified into a plurality of output categories of the decision tree, and wherein the statistic prediction result comprises respective statistic probabilities related to the plurality of output categories, the respective statistic probabilities being determined from the respective historical probabilities of the historical entities.

18. The system of claim 10, wherein a historical prediction result of a historical entity comprises a historical output value of the historical entity from a continuous output value range of the decision tree, and wherein the statistic prediction result comprises a mean value of the historical output values of the historical entities.

19. A computer program product tangibly stored on a computer readable storage medium that comprises machine-executable instructions configured to execute on a device and cause the device to:
obtain respective target values of a plurality of attributes of a target entity configured to form a prediction in a decision tree and;
construct representations of a plurality of leaf nodes of the decision tree, each of the representations configured to indicate respective statistic values of a plurality of attributes of historical entities located in each leaf node of the plurality of leaf nodes post historical traversal and a statistic prediction result determined from historical prediction results output at a respective one of the plurality of leaf nodes for the historical entities;

subsequently store each representation of each leaf node constructed;

subsequently access and distribute each representation of each leaf node constructed to a respective execution unit;

subsequently determine, in parallel in each respective execution unit, respective distance measures between the target entity and the plurality of leaf nodes based on the target values and the statistic values indicated by the representations of the plurality of leaf nodes; and subsequently determine a target prediction result for the target entity based on the respective distance measures and the statistic prediction results of the historical entities.

20. The computer program product of claim 19, wherein the machine-executable instructions are further configured to determine determining, by one or more processors, a plurality of subsets of distance measures between the target entity and a plurality of subsets of leaf nodes in parallel, each of the plurality of subsets of leaf nodes comprising at least one of the plurality of leaf nodes.

* * * * *